United States Patent [19]

Ukai et al.

[11] Patent Number: 5,642,199
[45] Date of Patent: Jun. 24, 1997

[54] COPIER HAVING A SECURITY FUNCTION

[75] Inventors: Takeshi Ukai; Tadato Hashiguchi, both of Yokohama, Japan

[73] Assignee: Ricoh Company, Ltd., Tokyo, Japan

[21] Appl. No.: 375,295

[22] Filed: Jan. 20, 1995

[30] Foreign Application Priority Data

Jan. 20, 1994 [JP] Japan .................... 6-004756

[51] Int. Cl.⁶ .................... H04N 1/00; H04N 1/32; H04N 1/44; G03G 21/00
[52] U.S. Cl. .................... 358/296; 358/401; 358/434; 358/440; 399/366; 380/18
[58] Field of Search .................... 358/296, 401, 358/404, 406, 426, 434, 436, 438, 440, 444, 447, 448, 450–453, 468, 501, 504, 526, 537–540; 399/81–83, 366; 395/101, 114–116; 382/232; 400/76; 380/18, 20, 23

[56] References Cited

U.S. PATENT DOCUMENTS 5,168,371  12/1992  Takayanagi .................... 358/296
5,444,518   8/1995  Hashiguchi et al. .................... 355/201
5,444,779   8/1995  Daniele .................... 358/468 X
5,473,691  12/1995  Menezes et al. .................... 358/440 X

*Primary Examiner*—Eric Frahm
*Attorney, Agent, or Firm*—Oblon, Spivak, McClelland, Maier & Neustadt, P.C.

[57] ABSTRACT

A digital copier or a complex copier having a facsimile function is provided with a security function for keeping a record of persons who copied or transmitted images, the dates of copying or transmission and the kinds of the images in a manner which is not known to a third person. When a scanner included in the copier is used, a document image is electrically or magnetically recorded in a security unit removably mounted on the copier. The document image is thinned or otherwise reduced in scale before written to the security unit. A keyword, password or similar information identifying a person is input on the copier. The document image is recorded in the security unit together with the person's identification and the date and time when the scanner is used. A plurality of such document images stored in the security unit are printed on a single paper at the same time.

10 Claims, 15 Drawing Sheets

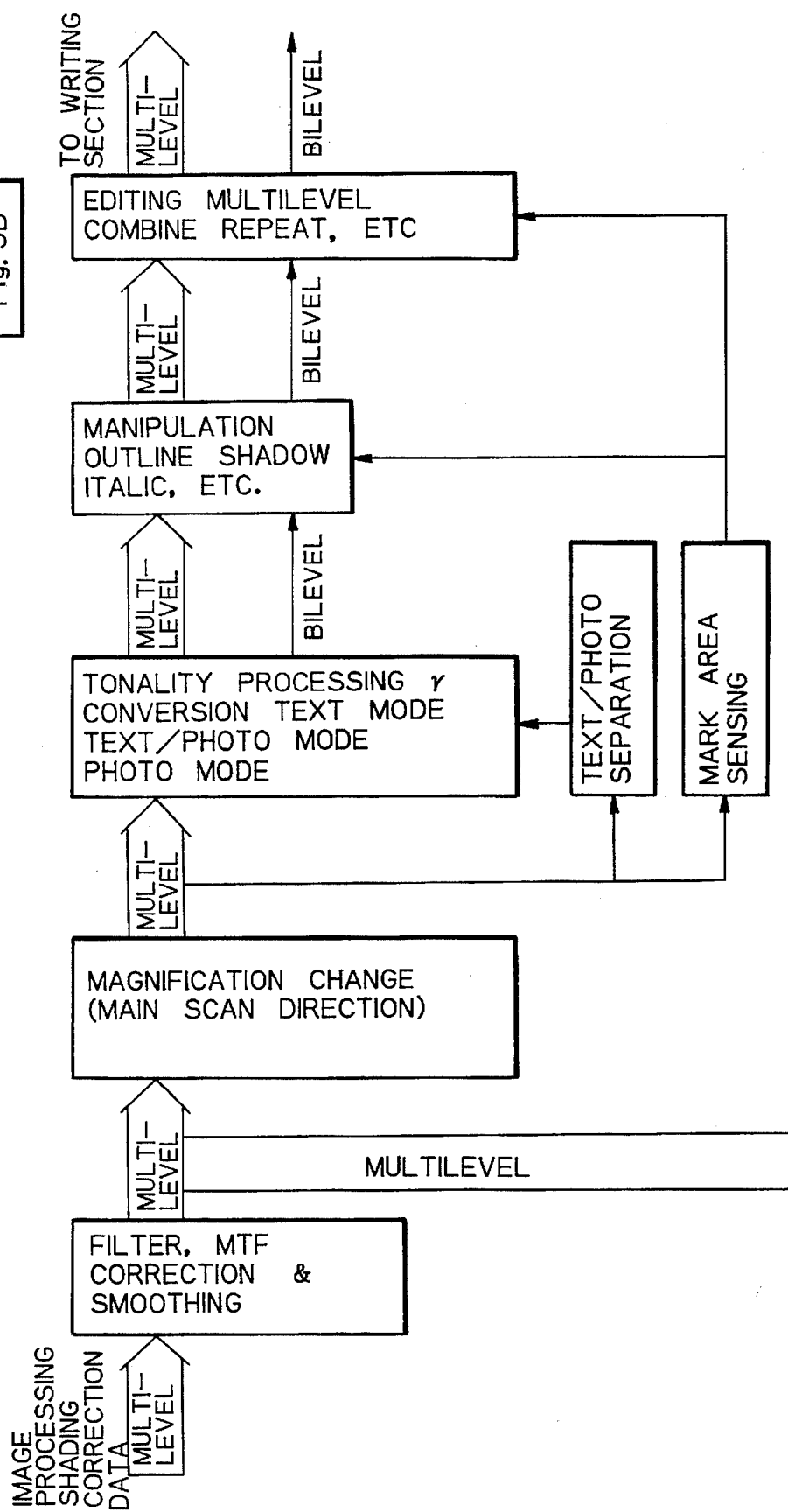

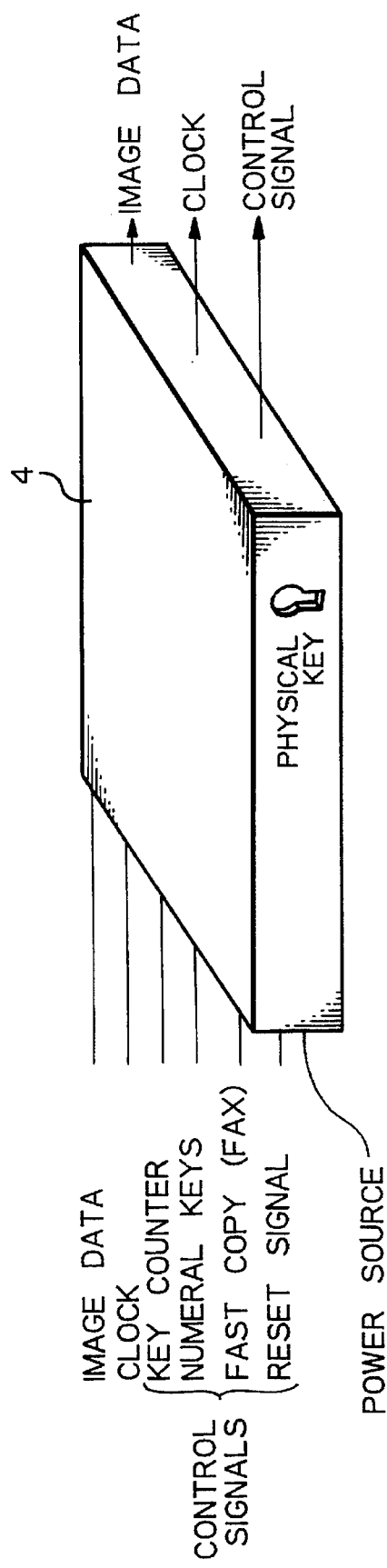

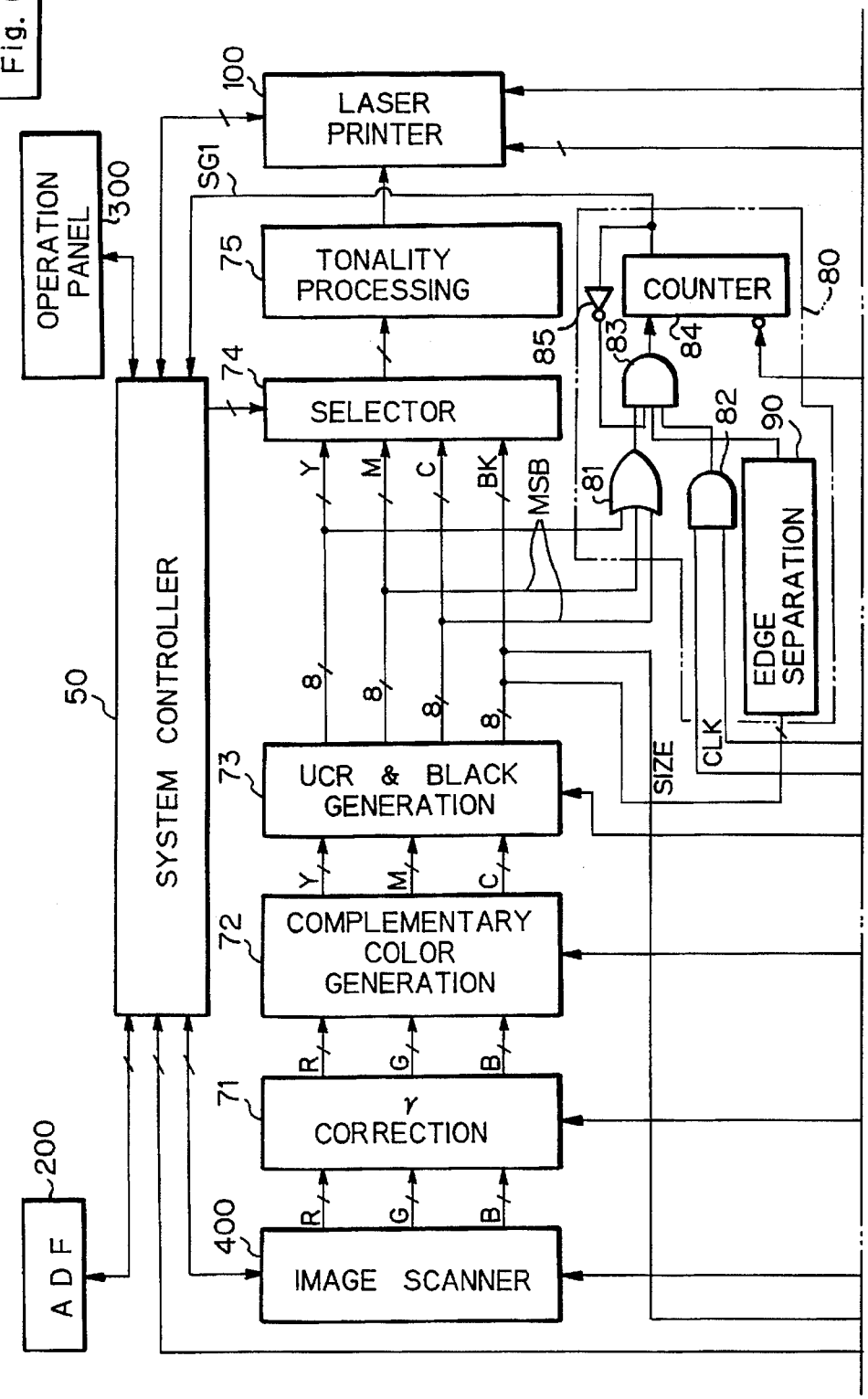

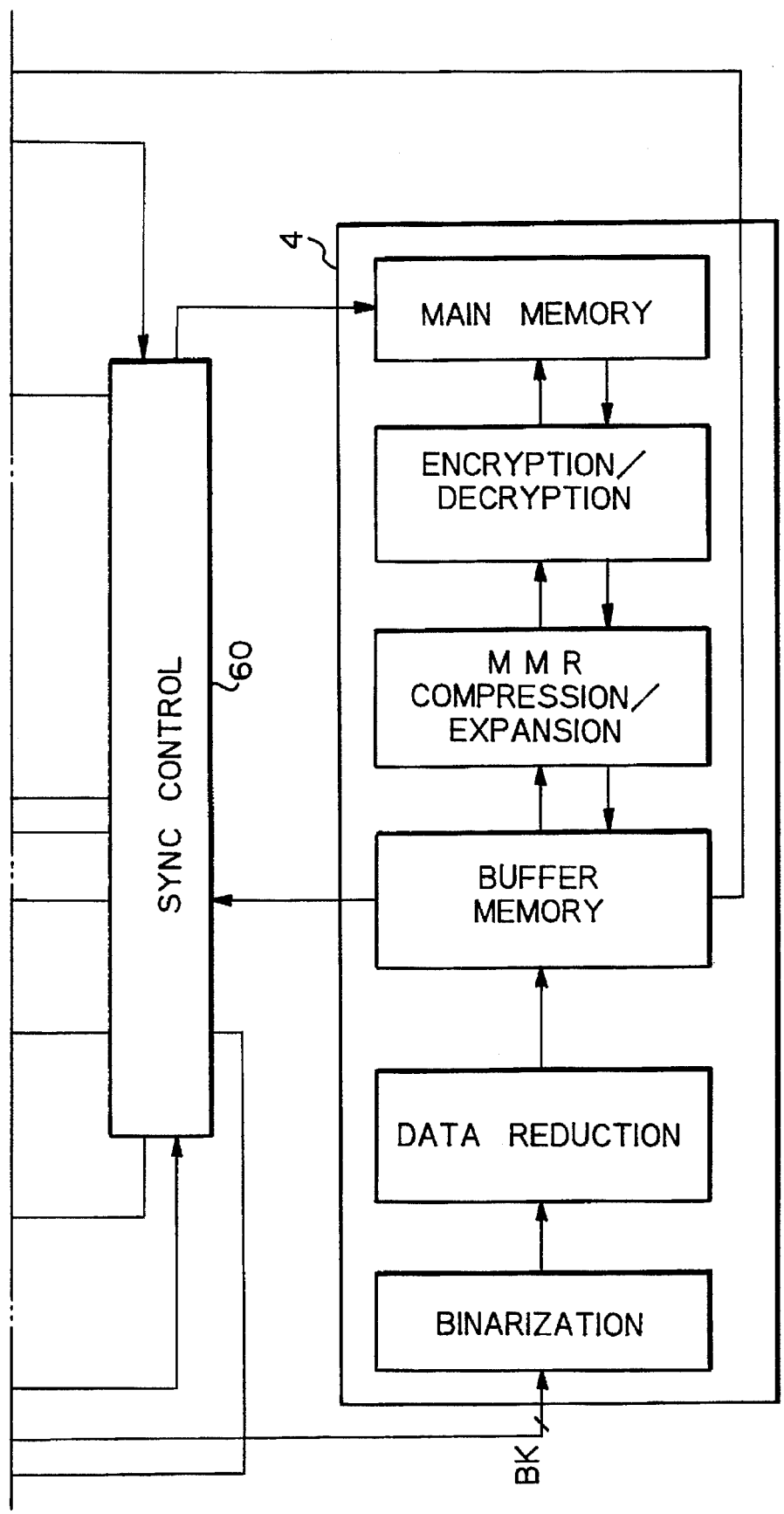

COPIER HAVING A SECURITY FUNCTION

BACKGROUND OF THE INVENTION

The present invention relates to a digital copier with or without a facsimile function and a digital copier having a color image forming function and, more particularly, to a copier having a security function for keeping a record of images copied, transmitted and received so as to control data.

The leak of secret documents brought about by the spread of copiers is a social problem awaiting a solution. At the present stage of development, it is extremely difficult to determine by whom, when and by which copier documents were copied. Some advanced color copiers are capable of printing a yellow code mark of neutral tint on a paper together with the duplication of a document image. With this kind of copier, it is possible to identify the machine used to copy the document by decoding the code.

However, a neutral tint is not available with a black-and-white copier. Moreover, even the copier capable of outputting a code mark on a sheet does not allow the person who copied a document to be identified. In addition, once the copy is carried away, which document was copied without permission cannot be determined. The copier may be so constructed as to produce two copies from each document and leave one of them within the copier while outputting the other copy. This, however, aggravates the wasteful consumption of papers.

Facsimile apparatuses include one having a memory for storing the number of documents sent, addressee, addresser, and other supervisory information. However, even with this kind of facsimile apparatus, it is not practicable to identify the person sent the documents or the contents of the documents.

SUMMARY OF THE INVENTION

It is, therefore, an object of the present invention to provide a digital copier or a complex copier having a facsimile function which is capable of leaving a record of persons copied or transmitted images, dates of copying or transmission, and kinds of the images in a manner not known to a third person.

It is another object of the present invention to provide a copier having means which combines the compression and encryption of images left in the copier to maintain the stored images unidentifiable to a third person and allows only an authorized person to decrypt such images.

It is a further object of the present invention to provide a digital copier having a multicolor image forming function which is capable of implementing the above security function by using a signal of at least one color necessary for the identification of an image.

A digital copier having a security function of the present invention has a reading unit for reading a document image, a compressing unit for compressing the document image read by the reading unit, a security unit for recording the document image compressed by the compressing unit together with information identifying a person and input from the outside of the security unit and a date and time when the reading unit is used, and an outputting unit for outputting the document image recorded in the security unit on a single paper together with other document images also recorded in the security unit.

BRIEF DESCRIPTION OF THE DRAWINGS

The above and other objects, features and advantages of the present invention will become more apparent from the following detailed description taken with the accompanying drawings in which:

FIG. 5 shows various signals to be input and output from a security unit;

FIG. 6 is a block diagram schematically showing the electrical arrangement of a digital color copier with which the present invention is also practicable;

DESCRIPTION OF THE PREFERRED EMBODIMENTS

Figure 1:
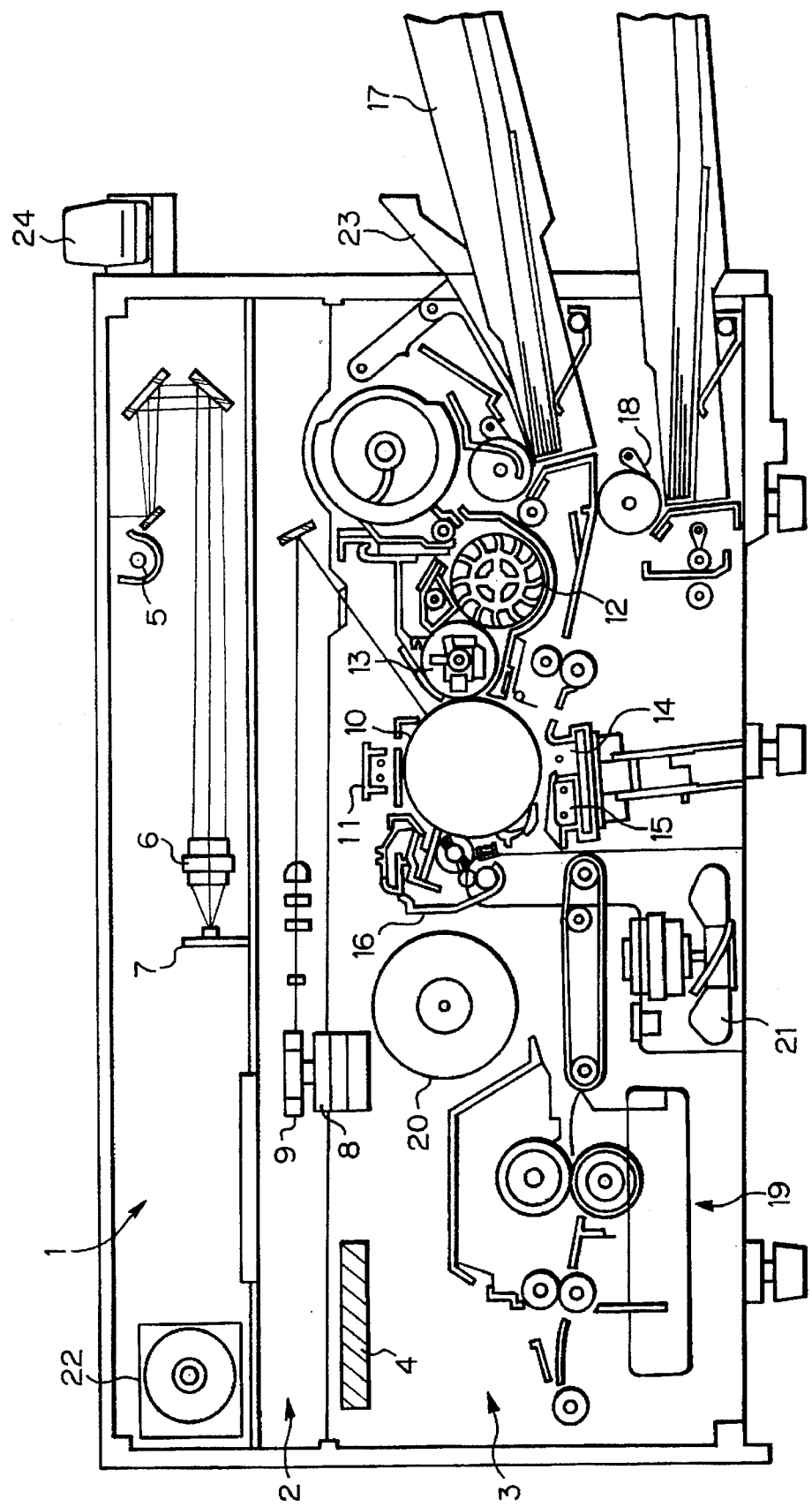
FIG. 1 is a section showing a specific construction of a digital copier with which the present invention is practicable.

Referring to FIG. I of the drawings, a digital copier with which the present invention is practicable is shown. As shown, the copier has an image scanner, generally 1, including a light source 5, mirrors, a lens 6, and a CCD (Charge Coupled Device) or similar image sensor 7. The scanner 1 reads a document on a pixel basis, binarizes it, and writes the resulting bilevel image data in an image memory. The reference numeral 22 designates a fan. An ADF (Automatic Document Feeder) and a cover plate are mounted on a glass platen also included in the image scanner 1, although they are not shown in the figure. An optical writing system 2 includes a laser diode or similar light source, a rotatable polygon mirror 9, a motor 8 for driving the mirror 9, and an f-theta lens. The writing system, or laser optics, 2 modulates a laser beam in response to the image data from the image scanner 1, thereby writing an image on a photoconductive element 10. The photoconductive element is included in an image forming section 3 and implemented as a drum 10. The image forming section 3 has, in addition to the drum 10, a main charger 11, a developing unit 12, a transfer charger 14, a separation charger 15, a cleaning unit 16, and a fixing unit 19. This section 3 forms an image by an electrophotographic process and constitutes a so-called laser printer in combination with the laser optics 2. A developing roller or sleeve 13 is disposed in the developing unit 12. Paper cassettes 17 are each loaded with a stack of papers of particular size. A pick-up roller 18 is associated with each of the paper cassettes 17. There are also shown in the figure a main motor 20, a fan 21, and a manual feed table 23. The copier is connectable to a subscriber line to play the role of a facsimile apparatus and, for this purpose, provided with a handset 24. A security unit 4, which is one of the characteristic features of the present invention, is removably disposed in the copier, as illustrated.

Figure 2:
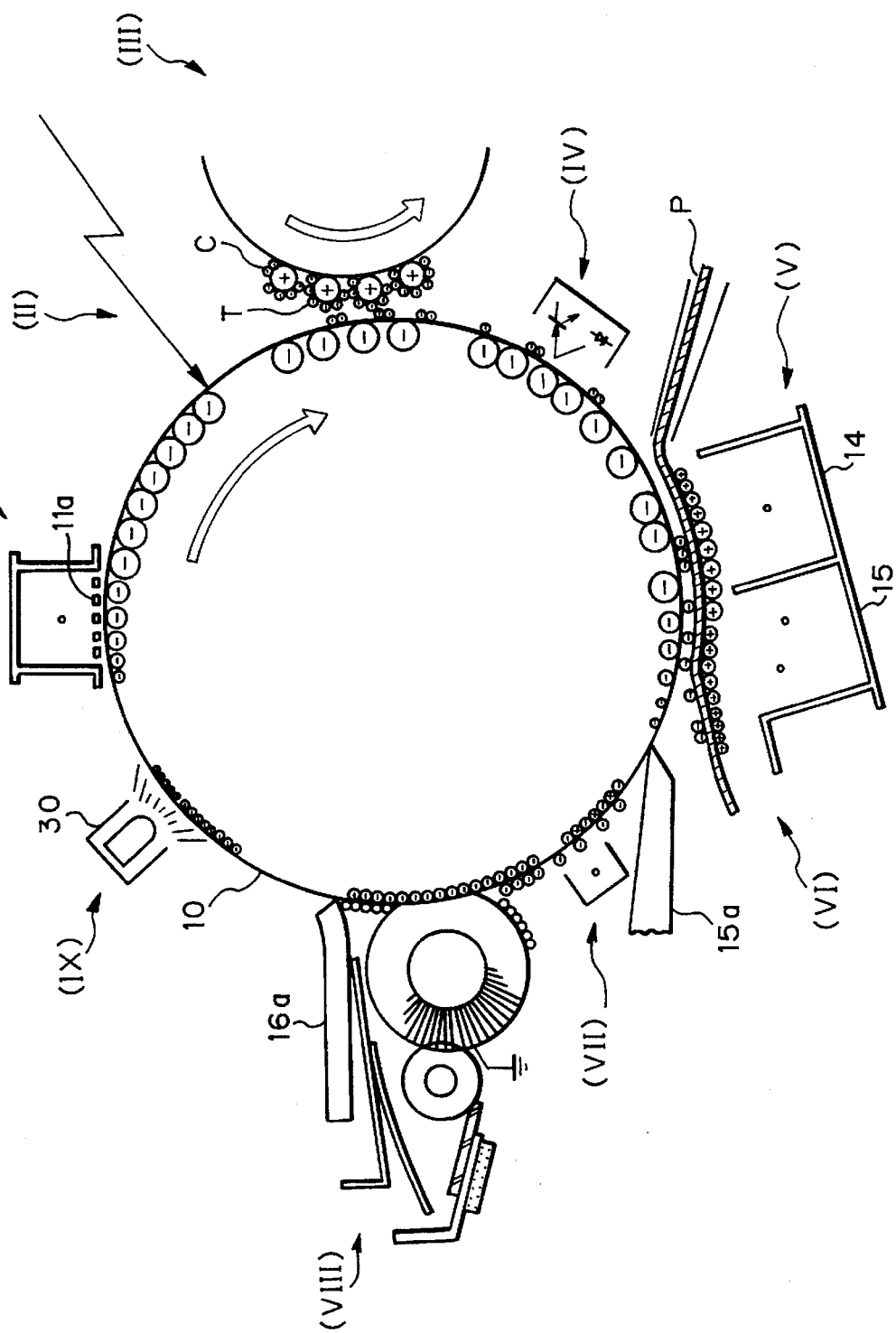
FIG. 2 is a view demonstrating an image forming process particular to the copier of FIG. 1.

The operation of the image forming section 3 will be described with reference to FIG. 2. As shown, at a charging station (I), the main charger 11 charges the surface of the drum 10 to negative polarity by corona discharge in the dark. A grid 11a provided on the casing of the charger 11 maintains the potential on the drum 10 uniform. At an exposing station (II), a laser beam issuing from the laser diode of the writing optics 2 is propagated through a collimator lens and cylinder lens to the polygon mirror 9 which is rotating at high speed. The laser beam reflected by the mirror 9 is routed through the f-theta lens and mirror to the drum 10. Specifically, as the laser diode emits light in response to image portions (black portions), the portions of the drum 10 illuminated by the light loses the negative potential. As a result, a latent image is electrostatically formed on the drum 10.

At a developing station (III), toner T is charged to negative polarity by friction and deposited on the developing sleeve 13. A bias (−550 V) is applied to the developing sleeve 13. In this condition, the toner T is deposited on the portions of the drum 10 where the negative charge is absent (image portions), thereby converting the latent image to a toner image. Carrier, accompanying the toner T, is labeled C in the figure.

At a sensor station (IV), a photosensor senses density of a predetermined image pattern also developed on the drum 10. A toner supply clutch, not shown, is included in the developing unit 12 and selectively coupled or uncoupled in response to the output of the photosensor so as to control the toner concentration. It is to be noted that the control based on the output of the photosensor should only be effected every time a preselected number of copies are produced (e.g. once for ten copies).

A paper P fed from any one of the cassettes 17 is brought to an image transfer station (V) in close contact with the drum 10. At this station (V), the transfer charger 14 applies a positive charge to the paper P from the rear with the result that the negatively charged toner is transferred from the drum 10 to the paper P. The image transfer station (V) is followed by a paper separating station (VI). At the station (VI), the separation charger (AC) 15 dissipates the positive charge deposited on the paper P at the station (V), thereby separating the paper P from the drum 10. To insure the separation of the paper P, a separator 15a follows the separation charger 15. The paper P coming out of the station (VI) is conveyed to the fixing unit 19. The fixing unit 19 fixes the toner image on the paper P with a heat roller and press roller, not shown.

A precleaning charger (PCC) (VII) applies a positive (negative) AC charge to the drum 10 in order to dissipate the positive charge remaining on the drum 10 after the image transfer. At a cleaning station (VIII), a conductive fur brush discharges the toner left on the drum 10, and then a cleaning blade 16a scrapes it off. A discharge lamp 30 is located at a discharging station (IX) and implemented by LEDs (Light Emitting Diodes) by way of example. The lamp 30 illuminates the entire surface of the drum 10 to prepare it for the next image forming cycle.

Figure 3B:
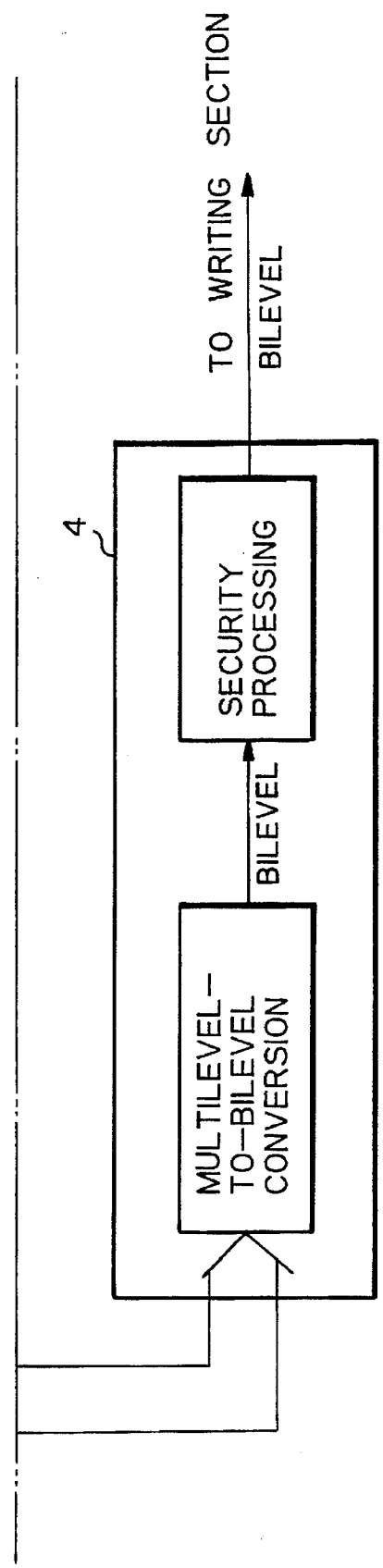
FIG. 3 is a flowchart showing a procedure in which the copier of FIG. 1 processes an image, together with the connection of a security processing section.
Figure 4:
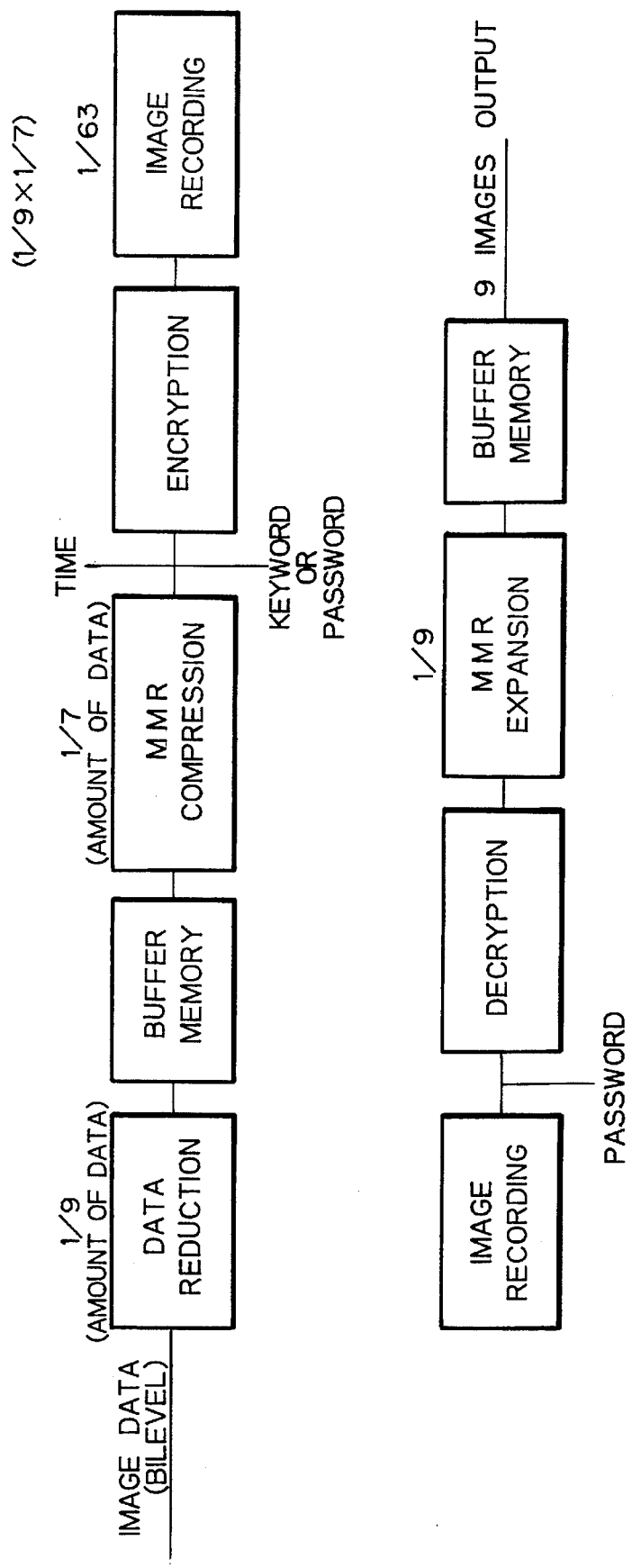
FIG. 4 is a flowchart showing image processing to be executed within the security processing section.

FIG. 3 demonstrates an image processing procedure particular to the copier together with the connection of a security processing section (security unit 4). FIG. 4 shows an image processing procedure to occur within the security processing section. Further, FIG. 5 shows various signals to be input and output from the security unit 4. The image processing procedure, mainly that of the security unit 4, will be described hereinafter.

As shown in FIG. 3, the security unit 4 receives multilevel image data undergone a series of image processing associated with the image sensor 7 of the image scanner 1, i.e., shading correction, filtering, MTF (Modulation Transfer Function) correction, and smoothing. The security unit 4 transforms the multilevel data to bilevel data by use of a predetermined threshold.

As shown in FIG. 4, the security unit 4 reduces, or thins, the bilevel data by picking up one dot out of three consecutive dots in each of the main and subscanning directions. For this purpose, a line buffer memory for temporarily storing part of an image is built in the security unit 4. As a result, the image data representative of a single image is reduced in scale to one-ninth. The reduced image is further compressed to about one-seventh by an MMR (Modified Modified Read Coding) system. The compressed image is encrypted by a data conversion table or Exclusive OR and then written to a hard disk (HD), magnetooptical (MO) disk, large capacity nonvolatile memory (RAM disk) or similar electric or magnetic recording means. Computation is executed with the encrypted data and encryption key data, e.g., password or similar secrecy signal. This prevents the encrypted data from being decrypted unless the pass word is input to the security unit 4.

About 2,000 original images are written to an HD, MO or similar storing means as compressed and encrypted data. The procedure up to the storage of data can be completed without slowing down the copying operation since the amount of data is reduced when input to the security unit 4. For example, assuming that the security unit 4 transforms 256 tones to two tones and then reduces the data to one-ninth, then $\frac{1}{8}$ bits×$\frac{1}{9}$=$\frac{1}{72}$ data are written to storing means implemented as a buffer memory. The data stored in the buffer memory are subjected to MMR compression and encryption and then written to an HD, MO or similar storing means. When an authorized person enters a keyword, the data are read out of, for example, the HD or MO, decrypted, expanded by MMR, and then output. It is noteworthy that nine different images can be printed on a single paper at the same time since each image has been reduced to one-ninth by thinning. In this case, although the copying speed may fall due to a reading speed available with an HD or MO, it is not critical in practice since such a printing is used merely for a checking purpose.

A person in charge of the copier may delete the images stored in the HD or MO after checking them or may write new images over old images when such recording means becomes full. Further, a personal computer, for example, may be connected to the security unit 4 in order to check the images on a CRT (Cathode Ray Tube) or similar display. Specifically, by connecting a personal computer to the security unit 4, the manager can search the contents of the HD, MO or similar storing means on a display and see the stored images on the basis of a date, person or mark and can even print only a particular image or a particular groups of images on a sheet. Furthermore, the contents of such storing means can be readily duplicated in an HD, MO or similar storing means located outside of the copier.

In accordance with the present invention, the copier stores an image together with an identification (ID) assigned to a person duplicated the image, the date of duplication, the number of copies produced, etc. Specifically, if the copier is so arranged as to require a person, intending to use the copier, to enter an ID by use of an ID card or keys, it is possible to record the person's ID, date, number of copies and other supervisory information the storing means of the security unit 4 together with an image. This allows the manager to easily trace the past operations of the copier as to the person, date and time, and kind of an image duplicated.

In the event of reducing the data by thinning, the copier may select an adequate thinning condition by referencing pixels surrounding a give pixel in order to enhance the quality of a reduced image. For example, the copier may omit a greater number of data when a black pixel continuously appears or omit no data for a thin line.

Moreover, to reduce the image data, a mean value of pixels lying in a given area is calculated and then binarized. In addition, if an arrangement is made such that the image data are adjustable as to the amount of reduction, it is possible to store an image without lowering the previously mentioned copying speed. This will be described with reference to FIGS. 6 and 7. While FIG. 6 shows the security unit 4 mounted on a digital color copier, which will be described, the security unit 4 operates in the same manner as described with reference to FIG. 4 as to image processing.

Only if image data are fully written to the buffer memory of the security unit 4 before an image scanner 400, FIG. 6, ends scanning an original document, they can be transferred to the main memory (e.g. HD or MO) without lowering the copying speed. Specifically, since a single original document should only be written to the security unit 4 once, a sufficient period of time is available for the transfer from the buffer memory to the main memory, taking account of the replacement of the document. An end-of-write signal from the buffer memory and an end-of-scan signal from the image scanner 400 are applied to a synchronization (SYNC) control circuit 60 and compared thereby. The result of comparison is fed to a system controller 50. If the end-of-write signal has appeared later than the end-of-scan signal, as indicated by the result of comparison, the system controller 50 selects a higher data reduction method.

Figure 7:
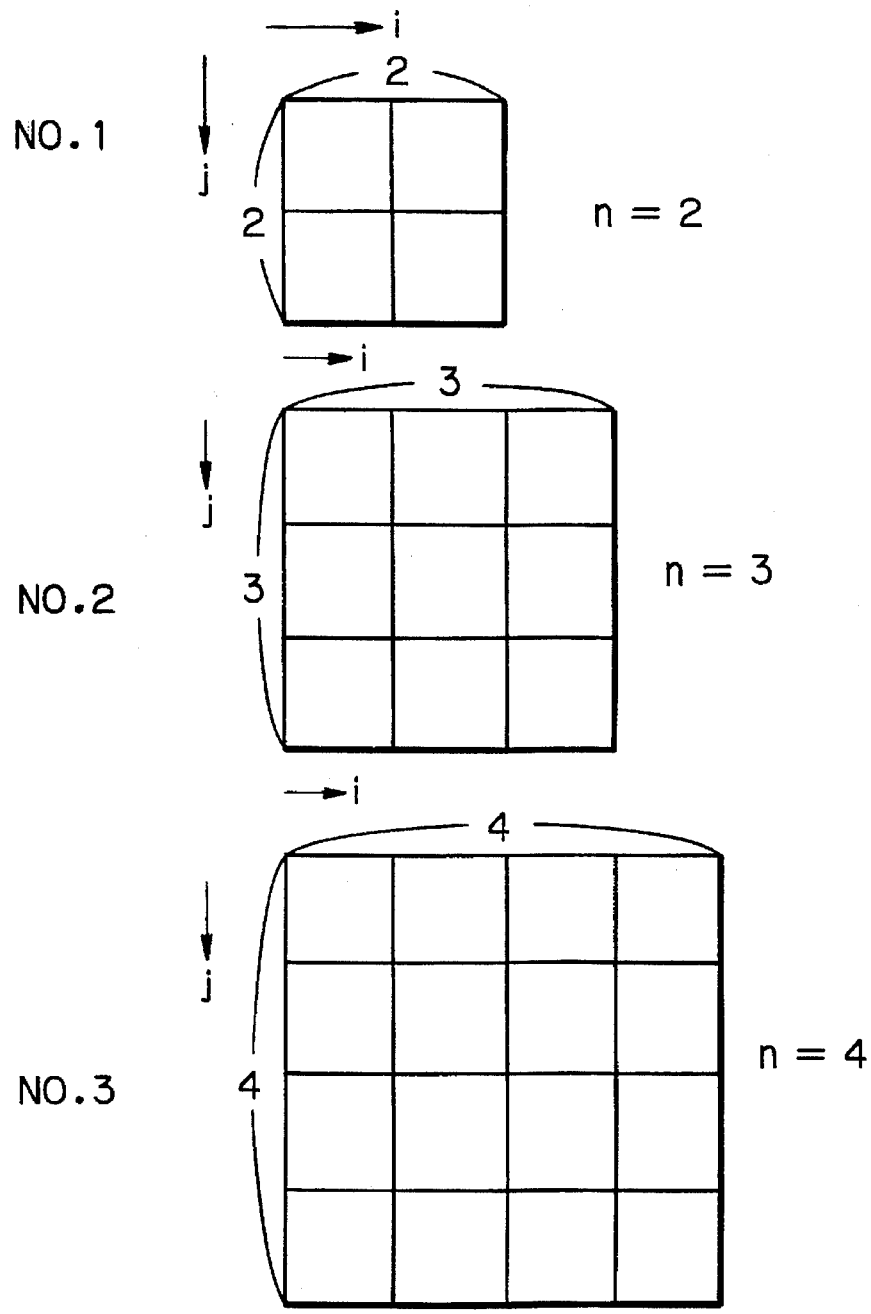
FIG. 7 demonstrates a specific scheme for reducing image data.

FIG. 7 shows the previously mentioned data reduction method using a mean value of pixels, i.e., three different processing level Nos. 1, 2 and 3. The processing level No. 1 binarizes the mean value of four pixels to thereby reduce the number of pixels to one-fourth. Likewise, the processing level Nos. 2 and 3 reduce the number of pixels to one-ninth and one-sixteenth, respectively. Therefore, when these level Nos. 1, 2 and 3 are sequentially selected in this order, the amount of data to be recorded is sequentially reduced, whereby the processing speed of the security unit 4 is changed. In a digital copier whose copying speed is constant, such processing levels will be entered on keys arranged on an operation panel 300 and will be set by the system controller 50, FIG. 6.

While the construction and operation of the present invention have been described in relation to a digital copier, the security unit 4 is similarly applicable to a digital copier having a facsimile function in order to manage images to be sent by facsimile. Specifically, since images to be sent by facsimile are also read by an image scanner, the images can be written to and managed by the security unit 4 in the same manner as during copying. In the event of facsimile transmission, the destination, number of documents sent, person sent the documents, and date and time of transmission can be recorded together with images.

Figure 8:
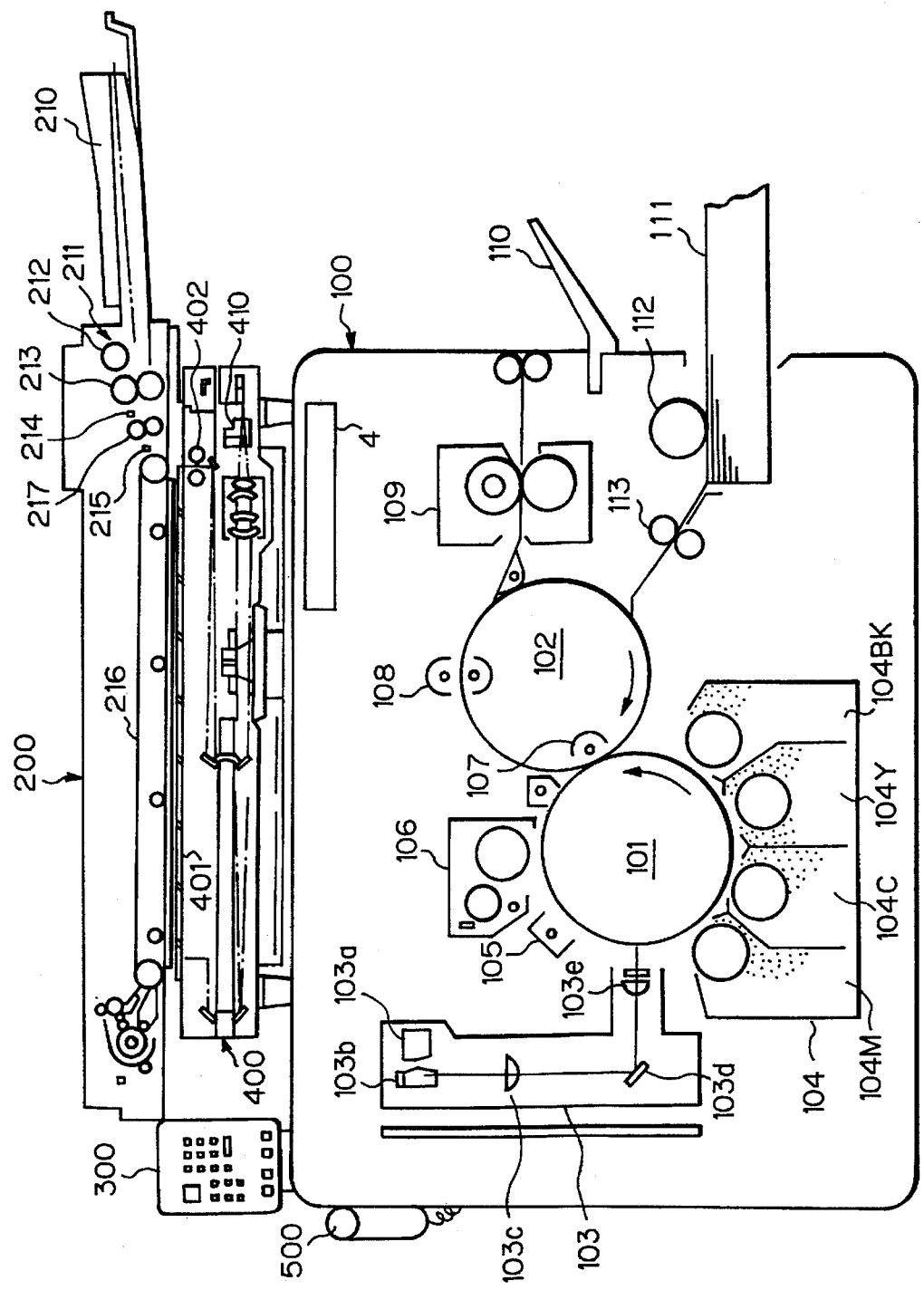
FIG. 8 is a section of a digital color copier to which the present invention is applicable.

The present invention may be implemented as a digital color copier, as distinguished from the above-stated black-and-white digital copier, as follows. FIG. 8 shows a specific construction of a digital color copier. As shown, the copier has a laser printer 100 for forming an image, an ADF 200 for automatically feeding a stack of documents one by one, an operation panel 300 on which various keys are arranged, and an image scanner 400 for reading a document image while separating it into color components. When image data (monocolor, multicolor or full-color) are sent from the image scanner 400 to the laser printer 100, the printer 100 prints them out to produce a monocolor, multicolor or full-color image. The security unit 4 is removably disposed in the copier in order to execute security processing when the image scanner is used. A handset 500 is mounted on the copier to implement a facsimile function.

The laser printer 100 has a photoconductive drum 101. Arranged around the drum 101 are process units for effecting a sequence of electrophotographic steps, i.e., a main charger 105, an optical writing unit 103 including a laser diode, a developing unit 104, an image transfer drum 102, and a cleaning unit 106. A laser beam from the laser diode is propagated through a polygon mirror 103b, a lens 103c, a mirror 103d and a lens 103e to the surface of the drum 101. The polygon mirror 103b is rotated at high speed by a motor 103a. The laser diode is driven by a pixel-based binary signal (recording/non-recording) corresponding to the density of an image to be recorded, as stated earlier. An image control device controls the drive signal for the laser diode such that the emission timing of the diode is synchronous to the rotation of the polygon mirror 103b which sequentially scans the consecutive pixel positions. More specifically, the image control device selectively turns on or turns off the laser diode such that a laser beam matching the density of a pixel (recording/non-recording) is incident to the corresponding position on the surface of the drum 101.

The surface of the drum 101 is uniformly charged to a high potential by corona discharge effected by the main charger 105 beforehand. The laser beam incident to the charged surface of the drum 101 causes the charge potential to change in matching relation to the intensity of the beam. That is, a potential distribution is formed on the drum 101 depending on whether or not the laser beam from the laser diode is incident. As a result, a potential distribution, e.g., electrostatic latent image is formed on the drum 101 on the basis of the tonality of a document image. The developing unit 104, located downstream of the writing unit 103, develops the latent image to convert it to a corresponding toner image. In the illustrative embodiment, the developing unit 104 is made up of four developing sections 104M, 104C, 104Y and 104BK containing M (magenta), cyan (C), Y (yellow) and BK (black) toner, respectively. The laser printer 100 is so constructed as to activate one of the developing units 104M–104BK at a time. Hence, the latent image is developed by one of the M, C, Y and BK toner.

A paper is fed from a paper cassette 111 by a pick-up roller 112, once stopped by a registration roller pair 113, driven toward the transfer drum 102 by the roller pair 113 at a predetermined timing, and then moved in contact with the drum 102 due to the rotation of the drum 102. A transfer charger 107 is located in the vicinity of the photoconductive drum 101 and charges the paper to transfer the toner image from the drum 101 to the paper.

In a monocolor copy mode, a paper carrying a toner image thereon and separated from the transfer drum 102 has the toner image fixed thereon by a fixing unit 109. Then, the paper is driven out of the copier to a tray 110. On the other hand, in a full-color mode, it is necessary to form BK, M, C and Y toner images on a single paper one above the other. In this mode, a BK toner image is formed on the drum 101 first and then transferred to a paper. Subsequently, while the paper is held in contact with the drum 102, an M toner image is formed on the drum 101 and then transferred to the paper over the BK toner image. A C toner image and a Y toner image are sequentially formed on the drum and transferred to the paper in the same manner as the BK and M toner images. Specifically, the formation and transfer of a toner image is repeated four times to complete a single color image on a single paper. When such a composite color image is completed on the paper, the paper is separated from the transfer drum 102 by a separation charger 108 and then driven out to the tray 110 via the fixing unit 109.

Referring to FIG. 6, the system controller 50 is implemented by a microcomputer and controls the operation of the entire copier. The SYNC control circuit 60 generates reference clock pulses and sends and receives various kinds of synchronizing signals which synchronize various control units. The scanning timing is based on a main scan synchronizing signal. In the illustrative embodiment, this synchronizing signal is synchronous to the time when the laser beam starts scanning the drum 101 due to the rotation of the polygon mirror 103b. An R (red), G (green) and B (blue) image signals generated by an image scanner 400 are converted to digital signals and then output as color image data each having eight bits. These data are subjected to various kinds of processing in an image processing unit, which will be described, and then sent to the laser printer 100.

The image processing unit is made up of a gamma (γ) correction 71, a complementary color generation 72, an undercolor removal (UCR) and black generation 73, a selector 74, and tonality processing 75. The complementary color generation 72 converts the R, G and B color image data to Y, M and C color image data which are complementary thereto. The UCR and black generation 73 separates black components from an image signal produced by combining all the Y, M and C image data input thereto and outputs the black components as a BK signal. At the same time, this circuit 73 removes black components from the image signals of remaining colors. The selector 74 selects, in response to a command from the system controller 50, one of the input Y, M, C and BK color signals and feeds it to the tonality processing 75. While the tonality processing 75 is used to binarize eight-bit density data input thereto, it executes dither processing with the input image signal in order to output a halftone image, as needed. The laser printer 100 receives the binarized image signals.

The output of the UCR and black generator 73 is fed to a color discrimination 80 as well as to the selector 74. The color discrimination 80 determines whether or not the document image contains a chromatic color. Among the output signals of the UCR and black generation 73, the BK (black) signal is applied to the security unit 4. The security unit 4 executes the previously stated security processing with an image derived from the BK signal and then writes the resulting data in a main memory (HD, MO or similar storing means).

Figure 9:
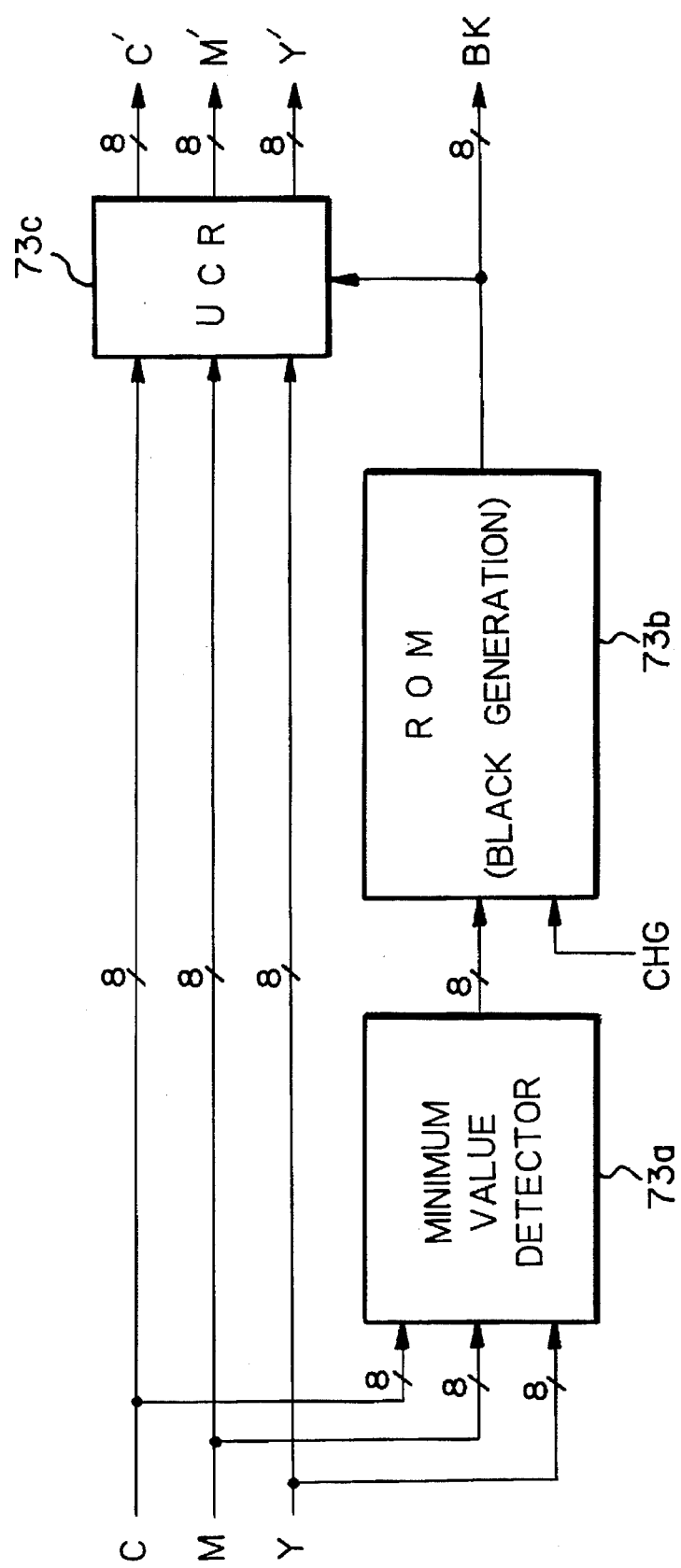
FIG. 9 is a block diagram schematically showing an undercolor removable (UCR) and black generation circuit included in the circuitry of FIG. 6.

FIG. 9 shows a specific construction of the UCR and black generation 73. As shown, the circuit 73 has a minimum value detector 73a which determines one of the C, M and Y color signals having the lowest tonality level to be an achromatic color signal. The separated achromatic signal (C, M or Y) is applied to a ROM (Read Only Memory) 73b. The ROM 73b generates a BK signal. A UCR 73c removes black components from the Y, M and C signals.

Figure 10A:
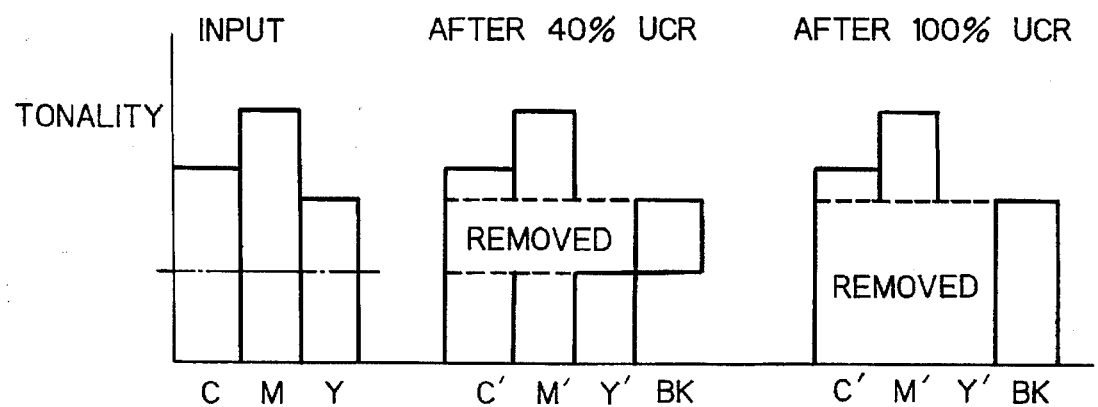
FIG. 10A is a graph indicating specific input signals to a UCR unit included in the UCR and black generation circuit and each having a particular tonality level on a color component basis.
Figure 10B:
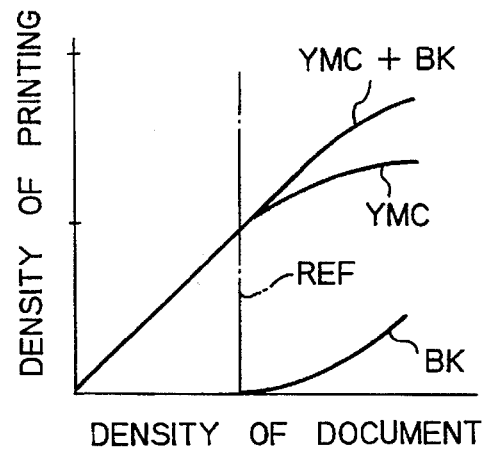
FIG. 10B shows a density characteristic for determining the operation range of the UCR unit.

FIG. 10A shows specific input and output signals of the UCR 73c each having a particular tonality level on a color component basis. FIG. 10B indicates a density characteristic for determining the operation range of the UCR 73c. Usually, the UCR 73c is designed to remove the undercolor by more than 40%.

While the embodiment causes the color discrimination 80 to automatically distinguish chromatic colors and achromatic colors, it additionally has a 100% UCR mode for chromatic/achromatic color discrimination. With the 100% UCR mode, it is possible to eliminate discrimination errors.

To determine whether or not a document image is chromatic by the color discrimination 80, it is necessary to read the entire document image once. For this purpose, a document is prescanned before it is scanned for actual image formation. The embodiment determines whether or not a document is chromatic by the prescanning operation.

Figure 11:
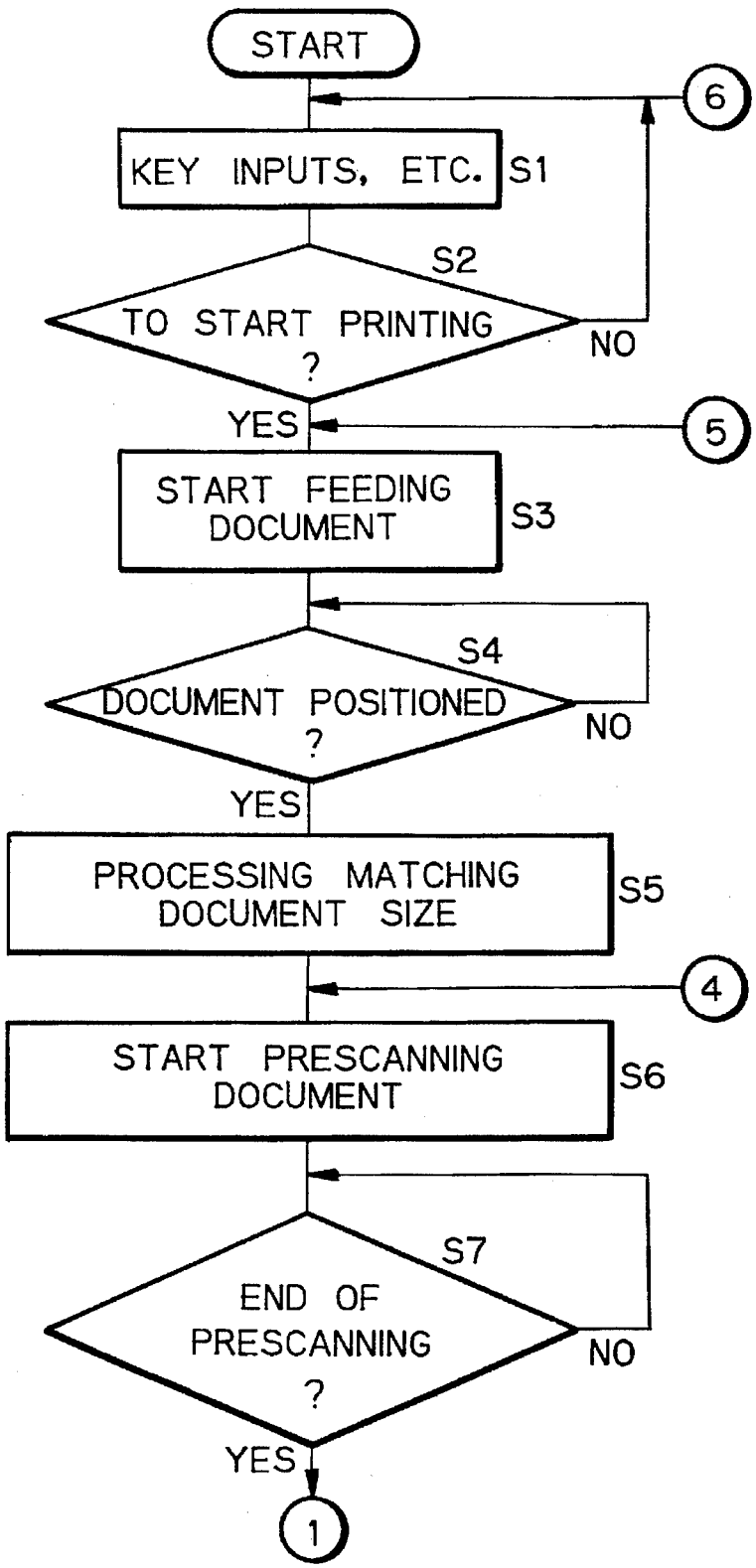
FIGS. 11, 12 and 13 are flowcharts outlining, in combination, the operation of a system controller shown in FIG. 6.
Figure 12:
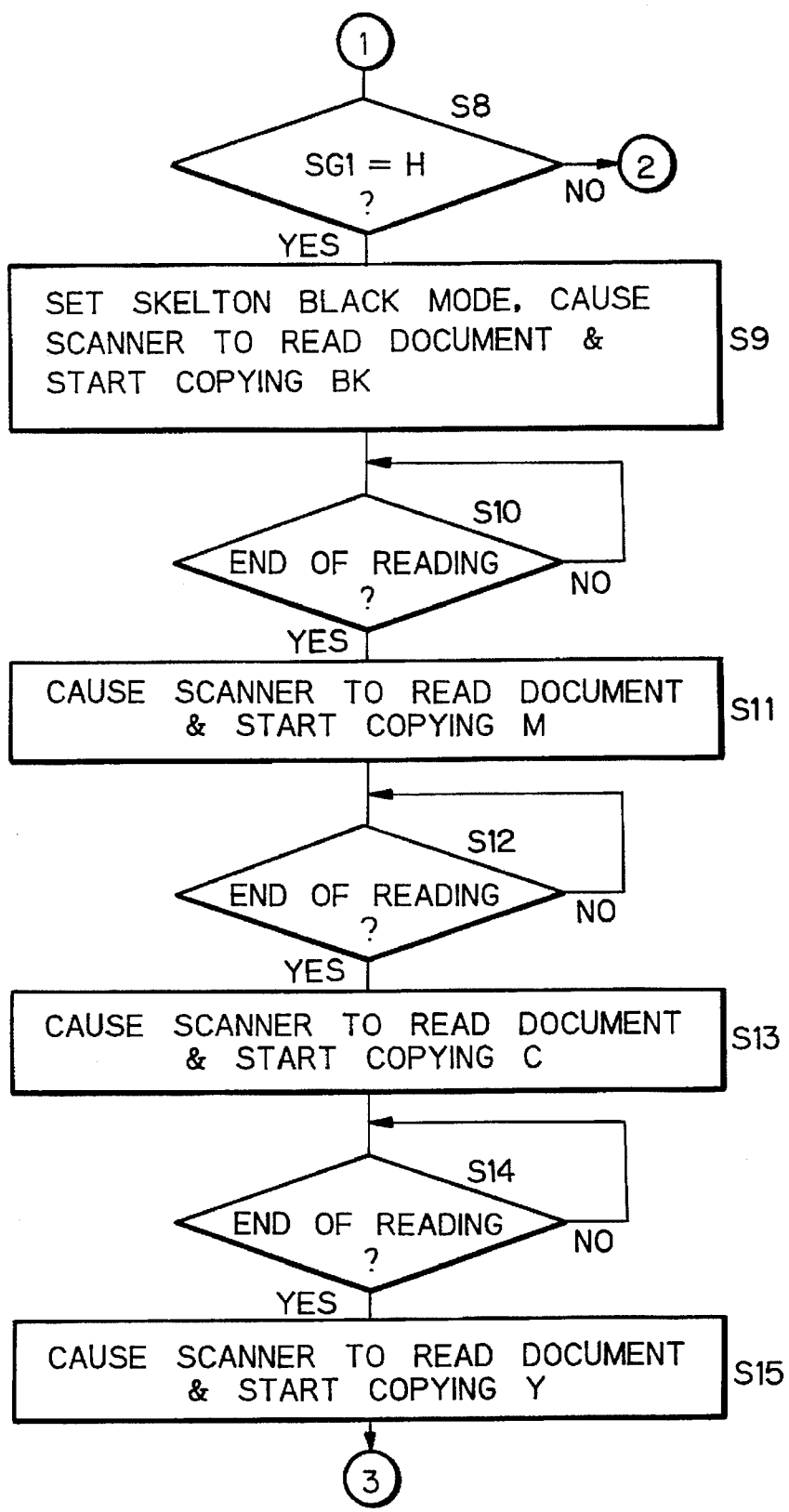
Figure 13:
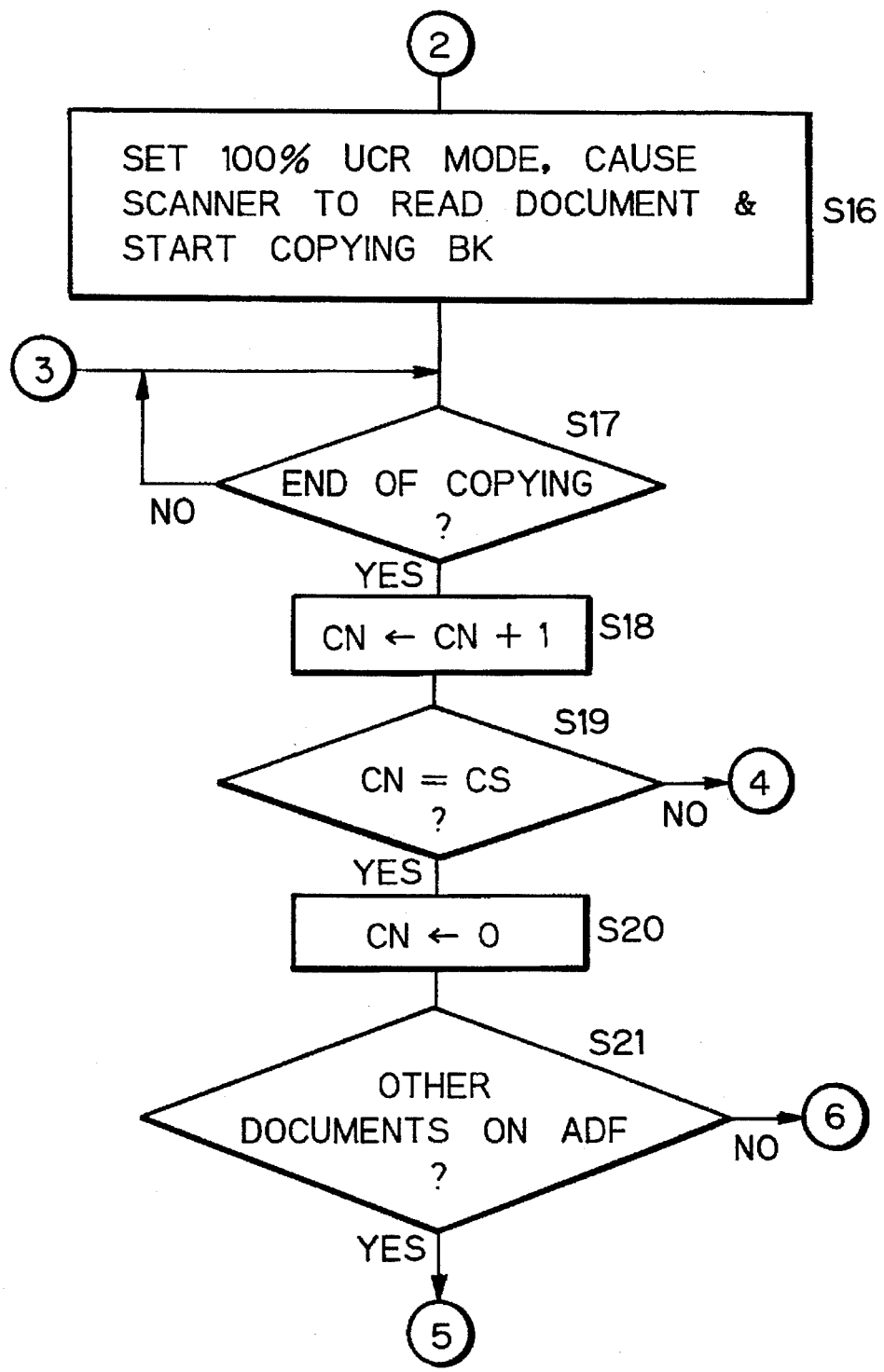

FIGS. 11–13 are flowcharts outlining the control over the entire copier which is executed by the system controller 50. The control procedure will be described with reference also made to FIGS. 6, 8 and 9. First, when a power supply is turned on, the system controller 50 effects initialization and warm-up to render the copier ready to operate. After the system controller 50 has received key inputs (number of copies, magnification change ratio, operator's ID, password and so forth) from the operation panel 300 (step S1), it waits until a print start key provided on the board 300 has been pressed (step S2). When the print start key is pressed, the system controller 50 sends a document feed signal to the ADF 200 (step S3). In response, the ADF 200 picks up the first or uppermost document and conveys it to a glass platen 401 included in the image scanner 400. The system controller 50 waits until the document has been brought to and set at a predetermined position on the glass platen 401 (step S4). After the ADF 200 has started feeding the document, it stops driving it on determining that the leading edge of the document has reached the left edge of the glass platen 401. Then, the ADF 200 sends an end-of-positioning signal to the system controller 50. In response, the system controller 50 executes particular processing matching the size of the document (step S5). Specifically, an edge sensor 214 is included in the ADF 200 and responsive to the leading edge of the document. Since the size of the document (width and length) is determined on the basis of the output of the edge sensor 214, the system controller causes the SYNC control circuit 60 to generate a size signal SIZE at a timing matching the document size.

After the step S5, the system controller 50 commands the image scanner 400 to start on prescanning (step S6). When the image scanner 400 reads the first document, the system controller 50 controls the UCR and black generation 73 first so as to set up the 100% UCR mode. In this condition, the image scanner 400 prescans the document. In this case, the laser printer 100 does not perform an image forming operation. After the prescanning (step S7), the system controller 50 references a chromatic color identification signal SG1 output from the color discrimination 80 to see if it is in a high level or "H", i.e., if the prescanned document is chromatic (step S8, FIG. 12).

If the answer of the step S8 is positive, i.e., if the document is chromatic, the system controller 50 replaces the 100% UCR mode with a skeleton black mode (usually more than 40% UCR), causes the image scanner 400 to start reading the document, and commands the laser printer 100 to start on a BK printing operation (step S9). As the image scanner 400 sequentially reads the document, the writing unit 103 is energized by, among the image signals generated by the scanner 400, the BK image signal. As a result, a latent image is electrostatically formed on the drum 101 and then converted to a toner image by the developing section 104BK of the developing unit 104. The toner image is transferred from the drum 101 to a paper brought to the transfer drum 102. At the same time, the BK signal is delivered to the security unit 4, subjected to data processing, encrypted, and then written to the main memory (HD, MO or similar storing means) together with the date, number of copies, operator's ID and other supervisory information.

After the image scanner 400 has read the document and the laser printer 100 has printed the BK image on a paper (step S10), the system controller 50 again commands the scanner 400 to read the same document and commands the printer 100 to print an M image (step S11). As the image scanner 400 sequentially reads the document, the writing unit 103 is energized by, among the image signals generated by the scanner 400, the M image signal. The resulting latent image is developed by the developing section 104M and then transferred to the paper carried on the transfer drum 102. After the M component of the document has been read (step S12), the system controller 50 again commands the scanner 400 to read the document and commands to the printer 100 to print a C image (step S13). Then, the writing unit 103 is energized by, among the image signals generated by the scanner 400, the C image signal. The resulting latent image is developed by the developing section 104C and then transferred to the paper. After such image reading and C image printing (step S14), the system controller 50 again commands the scanner 400 and printer 100 to start on document reading and Y image printing, respectively (step 15). Consequently, the writing unit 103 is energized by, among the image signals generated by the scanner 400, the Y image signal. The resulting latent image is developed by the developing unit 104Y and then transferred to the paper.

On the other hand, when the document image is achromatic (NO, step S8), the system controller 50 sets up the 100% UCR mode, causes the image scanner 400 to start reading the document, and causes the laser printer 100 to start recording an image in a preselected color (step S16, FIG. 13). If the preselected color is a primary color (Y, M, C) or black (BK), a single copying cycle ends when an image is fully recorded in the preselected color. In parallel with the single copying cycle, the image is processed by the security unit 4 and then written to the main memory. If the preselected color is a secondary color (R, G, B), the copying cycle is repeated in another color. At this instant, the value of BK to be output in the step S16 is set at X1 (and X2) matching the image formation in the secondary color.

After the copying cycle stated above (step S17), the system controller 50 increments a counter CN (step S18) and then compares the counter CN with the number of copies set CS (for each document) (step S19). If CN is smaller than CS, the system controller returns to the step S6 so as to repeat the copying process. If CN is equal to CS, the system controller 50 clears the counter CN (step S20) and determines whether or not any other documents are present on a document tray 210 included in the ADF 200 (step S21). If the answer of the step S21 is positive, YES, the system controller 50 returns to the step S3 for causing the ADF 200 to start feeding the next document. This is again followed by the copying procedure stated previously. If the answer of the step S21 is negative, NO, meaning that all the documents have been copied, the system controller 50 returns to the steps S1 and S2 to wait for the operation of the print start key.

As described above, the illustrative embodiment automatically changes the timing for starting feeding a document on the basis of the output of the color discrimination 80. Specifically, for a color document, the embodiment outputs a document feed signal every time a document is scanned [number of copies×4] times. For an achromatic document, the embodiment outputs it every time a document is scanned [number of copies×1 (or 2)] times. Hence, even achromatic documents and chromatic or color documents stacked together on the document tray 210 can be automatically fed and copied. This makes it needless for the operator to separate color pages from a stack of documents, rearrange the pages, or feed documents by hand. In addition, for an achromatic document, the embodiment reduces the period of time necessary for a single copying operation to complete.

As shown in FIGS. 6 and 8, the security unit 4 of this embodiment receives an image input signal derived from the BK signal. Therefore, an image, whether it be chromatic or achromatic, can be recorded in the security unit 4. During ordinary copying, the laser printer 100 prints an image in response to a signal from the tonality processing 75. On the other hand, when an image is to be output from the security unit 4, the unit 4 is selected in response to a key input on the operation board 300. In this condition, image data are read out of the main memory of the security unit 4, decrypted, and then sent to the laser printer 100. Since the image recorded in the security unit 4 is implemented only by the BK signal, it is printed only in black. However, even when a full-color document is copied, black components are separated from the document image. Hence, only if the threshold level for binarization is adequately selected, even a black image suffices for the identification of the document copied. Further, for an achromatic document, the security unit 4 reduces and compresses image data in exactly the same manner as in the previously stated monocolor digital copier. This also suffices for the identification of the document copied.

When the security unit 4 is mounted on a digital color copier, an image can be recorded therein without reducing the copying speed since it is implemented only by a BK signal. It is to be noted that when use is made of the security unit 4, an UCR ratio of greater than 60% is desirable in order to preserve the level of the BK signal.

In summary, it will be seen that the present invention provides a copier having various unprecedented advantages, as enumerated below.

(1) When a security unit is mounted on a digital copier or a complex copier having a facsimile function, an image read by a scanner is recorded in the security unit together with a date, operator's ID, number of copies and other supervisory information. Hence, when a document is copied or sent by facsimile by an unauthorized person, it is possible to identify the person later. This allows a person in charge of the copier to avoid improper copying and transmission and eliminate wasteful copies by checking images stored in the security unit from time to time.

(2) Since images are recorded in the security unit in a reduced scale, a number of images can be stored in the unit. Further, a plurality of such images can be printed on a single paper at the same time, so that papers are prevented from being wasted. Although the images are degraded due to thinning, they are fit for checking.

(3) The image data are reduced by thinning when input to the security unit. This allows the images to be written to a hard disk, magnetooptical disk or similar recording means without lowering the copying speed or the transmission speed.

(4) The images are encrypted before written to the security unit and can be decrypted only by an authorized person.

Therefore, secrecy is insured even when the hard disk, magnetooptical disk or similar recording means is carried away.

(5) By connecting, for example, a personal computer to the security unit, it is possible to display the images stored in the security unit on a display on the basis of the date, person, particular mark or similar key or to print them on a paper. Particularly, since only a desired image or a desired group of images can be searched for, the data recorded in the security unit can be checked or managed easily and rapidly. Moreover, only particular images can be output on a paper. It is also possible to copy the images stored in the security unit in another electric or magnetic recording medium via, for example, a personal computer. When use is made of a hard disk, magnetooptical disk or similar recording means, the images stored in the security unit can be reset by particular inputting means. In addition, when the security unit is filled up with such images, new images can be sequentially written over the existing images. This eliminates a capacity problem and, therefore, the omission of image data.

(6) when the copier has a function of forming an image in two or more colors, at least one of the colors is input to the security unit. Particularly, when the copier has a color image forming function, an image to be input to the security unit is derived from a BK (black) signal produced from R, G and B signals together with Y, M and C signals. Hence, image data can be dealt with in the above-described manner on the basis of at least one color signal necessary for the identification of an image. Therefore, even a full-color image represented by a great amount of data is recorded in the security unit in the form of a single color signal, i.e., BK signal. This successfully reduces the recording time and the amount of data and, therefore, allows image data to be recorded without lowering the copying speed and without regard to the storage capacity.

Various modifications will become possible for those skilled in the art after receiving the teachings of the present disclosure without departing from the scope thereof.

What is claimed is:

1. A digital copier having a security function, comprising:

reading means for reading a document image;

compressing means for compressing said document image read by said reading means;

a security unit for recording said document image compressed by said compressing means together with information identifying a person and input from the outside of said security unit and a date and time when said reading means is used; and outputting means for outputting said document image recorded in said security unit on a single paper together with other document images also recorded in said security unit.

2. A copier as claimed in claim 1, wherein said said security unit comprises electric or magnetic storing means.

3. A copier as claimed in claim 2, further comprising encrypting means for encrypting said document image to be recorded in said security unit, and decrypting means for decrypting, only when a particular signal is input to said copier, said document image encrypted by said encrypting means.

4. A copier as claimed in claim 3, further comprising displaying means for displaying said document image recorded in said security unit together with a copying date, a number copies produced, and a person's ID.

5. A copier as claimed in claim 4, further comprising searching means for searching for a particular image or a particular group of images to be output on a paper by said outputting means.

6. A copier as claimed in claim 5, further comprising means for copying said document image recorded in said security unit in external recording means.

7. A copier as claimed in claim 6, further comprising resetting means for resetting said document image recorded in said security unit.

8. A copier as claimed in claim 7, wherein when said storing means is filled up with document images, new images are sequentially written over old images existing in said storing means.

9. A copier as claimed in claim 8, wherein when said copier has a function of forming an image in two or more colors, image data of at least one color is input to said security unit.

10. A copier as claimed in claim 8, wherein when said copier has a color image forming function, among Y (yellow), M (magenta), C (cyan) and BK (black) signals derived from an R (red), G (green) and B (blue) signals representing a color image, said BK signal is input to said security unit.

* * * * *